United States Patent
Yoshida et al.

(10) Patent No.: US 10,302,051 B2
(45) Date of Patent: May 28, 2019

(54) INTAKE DEVICE

(71) Applicant: AISIN SEIKI KABUSHIKI KAISHA, Kariya-shi, Aichi-ken (JP)

(72) Inventors: Manaho Yoshida, Kariya (JP); Masato Ishii, Kariya (JP); Kyohei Ninomiya, Kariya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 154 days.

(21) Appl. No.: 15/472,421

(22) Filed: Mar. 29, 2017

(65) Prior Publication Data

US 2018/0058399 A1 Mar. 1, 2018

(30) Foreign Application Priority Data

Aug. 26, 2016 (JP) ................. 2016-165913

(51) Int. Cl.
 *F02M 35/10* (2006.01)
 *F02M 35/16* (2006.01)
 *F16K 1/22* (2006.01)

(52) U.S. Cl.
 CPC ..... *F02M 35/10255* (2013.01); *F02M 35/10321* (2013.01); *F02M 35/16* (2013.01); *F16K 1/22* (2013.01); *F16K 1/224* (2013.01)

(58) Field of Classification Search
 CPC ....... F02M 35/10255; F02M 35/10321; F02M 35/16; F16K 1/22
 USPC ...................................................... 251/308
 See application file for complete search history.

(56) References Cited

U.S. PATENT DOCUMENTS

| | | | |
|---|---|---|---|
| 8,052,118 B2* | 11/2011 | Sano | F02B 31/06 251/308 |
| 2007/0063164 A1* | 3/2007 | Torii | F02D 9/106 251/308 |
| 2014/0367600 A1* | 12/2014 | Hodebourg | F16K 1/221 251/308 |
| 2015/0330340 A1 | 11/2015 | Oiwa et al. | |

FOREIGN PATENT DOCUMENTS

| | | |
|---|---|---|
| JP | 2006-275107 A | 10/2006 |
| JP | 2010-001847 A | 1/2010 |
| JP | 2014-152632 A | 8/2014 |
| JP | 2014-152755 A | 8/2014 |

* cited by examiner

*Primary Examiner* — Michael R Reid
(74) *Attorney, Agent, or Firm* — Buchanan Ingersoll & Rooney PC

(57) ABSTRACT

An intake device includes: a rotary shaft; and a resin-made intake valve including a rotary shaft press-fit guide hole provided at an end portion in a rotary axis direction to guide the rotary shaft when the rotary shaft is press-fitted, a rotary shaft press-fit hole provided on a more inner side than the rotary shaft press-fit guide hole in the rotary axis direction, the rotary shaft inserted through the rotary shaft press-fit guide hole being press-fitted into the rotary shaft press-fit hole, and a window portion exposing an outer surface of the rotary shaft, the resin intake valve being rotated together with rotation of the rotary shaft in the intake port to change intake air, in which the rotary shaft press-fit guide hole has a tapered shape portion which gradually decreases in cross-sectional area toward the rotary shaft press-fit hole when viewed from the rotary axis direction.

9 Claims, 5 Drawing Sheets

INTAKE DEVICE

CROSS REFERENCE TO RELATED APPLICATIONS

This application is based on and claims priority under 35 U.S.C. § 119 to Japanese Patent Application 2016-165913, filed on Aug. 26, 2016, the entire contents of which are incorporated herein by reference.

TECHNICAL FIELD

This disclosure relates to an intake device, and more particularly to an intake device including a rotary shaft and an intake valve that is rotated together with rotation of the rotary shaft within an intake port to change intake air.

BACKGROUND DISCUSSION

In the related art, there has been known an intake device including a rotary shaft and an intake valve that is rotated within an intake port together with the rotation of the rotary shaft to change intake air (see, e.g., JP 2010-001847A (Reference 1)).

Reference 1 discloses an intake device that includes a resin-made intake control valve (intake valve) that is disposed in each of four intake pipe portions (intake ports) to be rotated between an opened position and a closed position, a common shaft (rotary shaft) that rotates respective intake control valves in unison, and an actuator that rotates the shaft. Each intake control valve in the intake device described in Reference 1 has a shaft penetrating portion into which the shaft is inserted. Through holes (rotary shaft press-fit holes) each having a rectangular shape in cross section are respectively formed at the opposite end portions in the rotary axis direction of the shaft penetrating portion. In addition, the opposite end portions of the shaft penetrating portion are configured as sliding portions (rotary shaft portions) rotatable with respect to bearing parts arranged on the intake port side, and the through holes are formed inside the sliding portions (rotary shaft portions). In addition, since the shaft having a square shape (rectangular shape) in cross section is press-fitted into a pair of through holes (rotary shaft press-fit holes) provided at the opposite end portions of the shaft penetrating portion, the intake control valves are fixed to the shaft.

However, in the intake device of Reference 1, since the press-fitted positions (fixed positions) of the shaft are disposed at the opposite end portions of the shaft penetrating portion, the press-fitted shaft (rotary shaft) itself is likely to be bent and deformed due to the warpage of the resin-made intake control valves (intake valves) along the rotary axis direction. As a result, there is a problem in that the opposite end portions of the intake control valves are likely to be axially displaced from each other, so that the rotating resistance of the sliding portions (rotary shaft portions) with respect to the bearing parts increases. In addition, when uneven wear of the bearing parts occurs due to the axial displacement of the sliding portions (rotary shaft portions), leakage of intake air is likely to occur between the intake pipe portions (intake ports) which are adjacent to each other through a gap formed between the sliding portions and the bearing parts. For this reason, intake air pulsation (intake inertia effect) cannot be effectively obtained due to the degradation of the sealing property of the intake control valve (intake valve), and there is a problem that the engine performance is degraded.

Thus, a need exists for an intake device which is not susceptible to the drawback mentioned above.

SUMMARY

An intake device according to an aspect of this disclosure includes: a rotary shaft; and a resin-made intake valve including a rotary shaft press-fit guide hole provided at an end portion in a rotary axis direction to guide the rotary shaft when the rotary shaft is press-fitted, a rotary shaft press-fit hole provided on a more inner side than the rotary shaft press-fit guide hole in the rotary axis direction, the rotary shaft inserted through the rotary shaft press-fit guide hole being press-fitted into the rotary shaft press-fit hole, and a window portion configured to expose an outer surface of the rotary shaft press-fitted to the rotary shaft press-fit hole. The resin intake valve is rotated together with the rotation of the rotary shaft in an intake port to change intake air. The rotary shaft press-fit guide hole has a tapered shape portion which gradually decreases in cross-sectional area toward the rotary shaft press-fit hole when viewed from the rotary axis direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to FIGS. 1 to 9.

With reference to FIGS. 1 to 9, an intake device 100 according to an embodiment disclosed here will be described.

(Structure of Intake Device)

Figure 1:
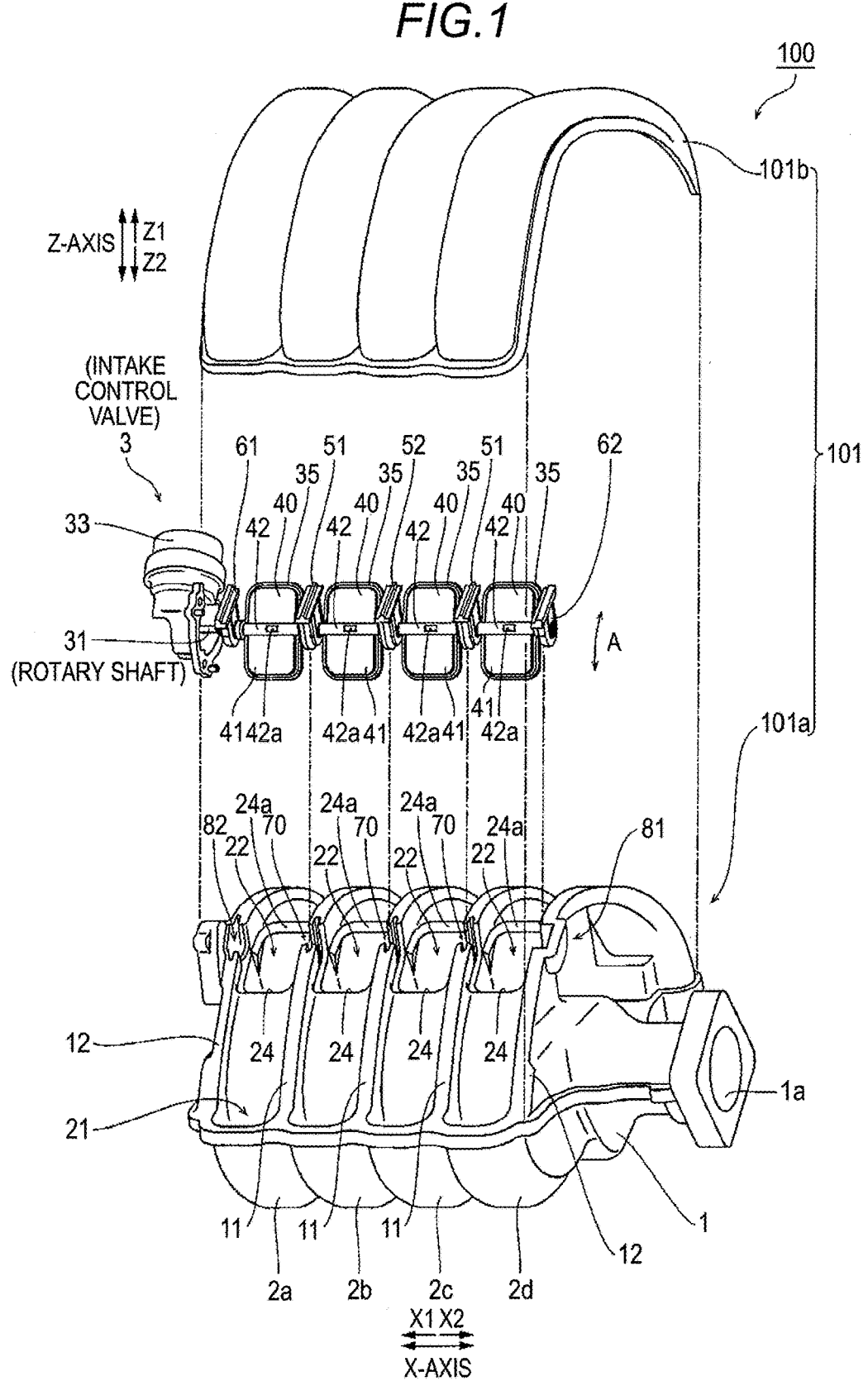
FIG. 1 is an exploded perspective view illustrating a configuration of an intake device according to an embodiment disclosed here.

As illustrated in FIG. 1, the intake device 100 is mounted on an in-line four-cylinder engine 110 (see FIG. 2) for a vehicle (automobile) that is constituted with a gasoline engine. The intake device 100 includes a surge tank 1 extending in an X-axis direction, four intake ports 2a to 2d connected to the downstream of the surge tank 1, and an intake control valve 3 provided inside each of the intake ports 2a to 2d. Further, in the intake device 100, the surge tank 1 and the intake ports 2a to 2d are integrated so as to constitute an intake device main body 101.

In the intake device main body 101, a resin-made main body 101a and a resin-made cover member 101b are joined to each other by vibration welding in a state where the intake control valve 3 is mounted to the main body 101a. Therefore, the intake control valve 3 is operably provided inside the intake device main body 101. In addition, the intake device 100 is connected to a cylinder head 90 (see FIG. 2), and the intake ports 2a to 2d are connected to the cylinders of the engine 110 via the cylinder head 90. In addition, in FIG. 1, the engine 110 (see FIG. 2) is arranged behind the intake device main body 101 (at the depth side of the paper surface).

Intake air flows into the surge tank 1 from the inlet portion 1a. The intake ports 2a to 2d connected to the bottom side of the surge tank 1 are arranged side by side in the X-axis direction to be adjacent to each other with an intermediate partition wall 11 being interposed therebetween. In addition, on the opposite side (X1 side) to the intermediate partition wall 11 constituting the outermost intake port 2a and on the opposite side (X2 side) to the intermediate partition wall 11 constituting the outermost intake port 2d, end partition walls 12 are formed, respectively.

Figure 2:
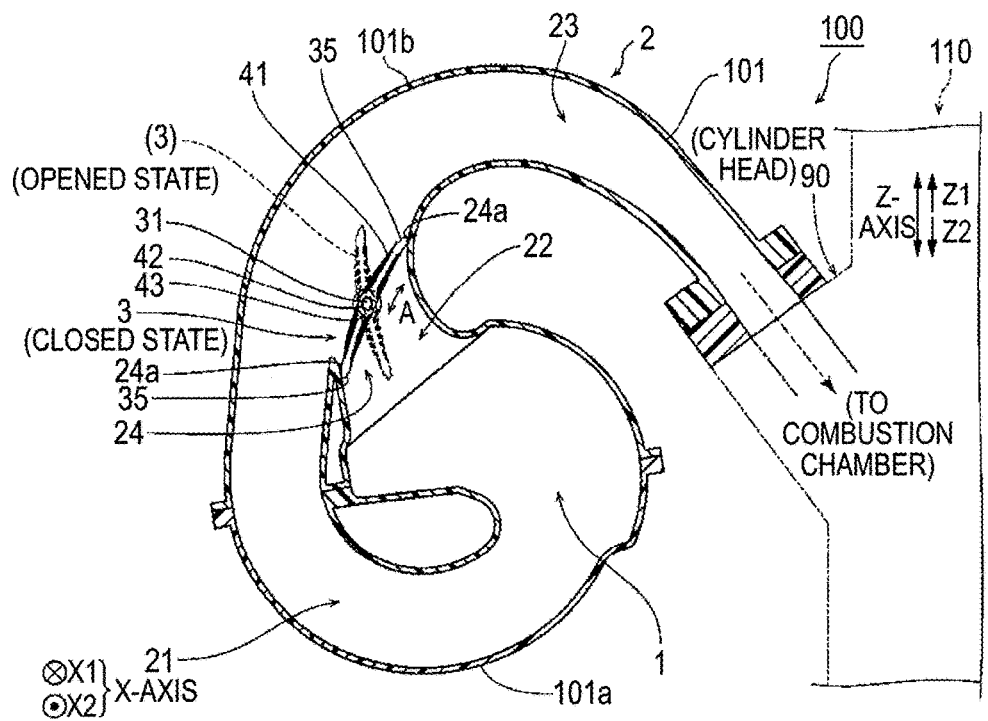
FIG. 2 is a schematic cross-sectional view taken along an intake port of an intake device according to the embodiment disclosed here.

In addition, as illustrated in FIG. 2, each of the intake ports 2a to 2d includes a relatively long first port portion 21 and a relatively short second port portion 22, and an outlet port portion 23 disposed at the downstream side of the first port portion 21 and the second port portion 22. The first port portion 21 extends upward (in the direction of arrow Z1) while turning around the bottom side (Z2 side) of the surge tank 1 to be connected to the corresponding outlet port portion 23. On the other hand, the second port portion 22 is configured to connect the surge tank 1 and the corresponding outlet port portion 23 via the intake control valve 3.

The intake control valve 3 has a function of opening and closing four opening portions 24 located at connection portions between the respective second port portion 22 and outlet port portions 23. In a state where the intake control valve 3 is closed (indicated by a solid line), a long port having a large intake path length is formed by the first port portion 21 and the outlet port portion 23. Further, in a state where the intake control valve 3 is opened (indicated by a two-dot chain line), a short port having a small intake path length is formed by the second port portion 22 and the outlet port portion 23. Accordingly, in the intake device main body 101, the intake path length is changed when the opening portions 24 are opened and closed by the intake control valve 3. That is, the intake control valve 3 functions as a variable intake valve that changes the intake path length to each cylinder of the engine 110. Therefore, in the intake device 100, the intake path length is changed according to the engine speed and the engine load, and an appropriate amount of intake air is supplied to each cylinder of the engine 110 via the cylinder head 90.

(Structure of Intake Control Valve)

Figure 3:
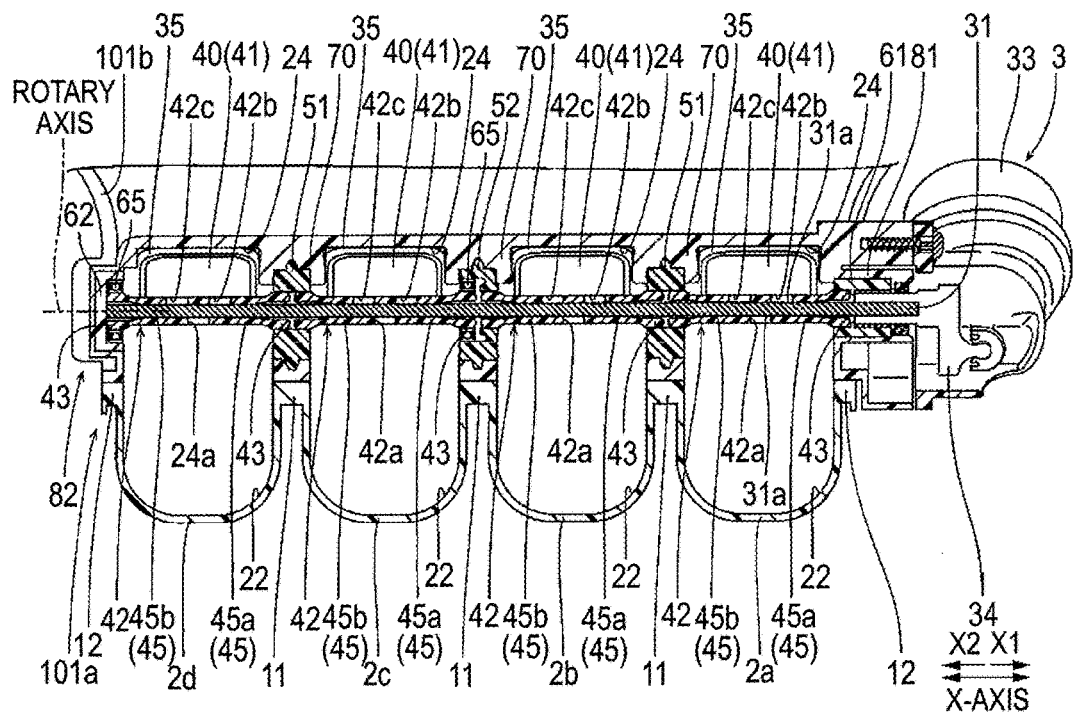
FIG. 3 is a cross-sectional view taken along a rotary shaft of an intake control valve of the intake device according to the embodiment disclosed here.

As illustrated in FIG. 3, the intake control valve 3 includes a shaft 31 (an example of the rotary shaft), four valve bodies 40 (an example of the intake valves), an actuator 33 that rotates the shaft 31 by a driving force, and a link member 34 that transmits the driving force of the actuator 33 to the shaft 31.

Figure 7:
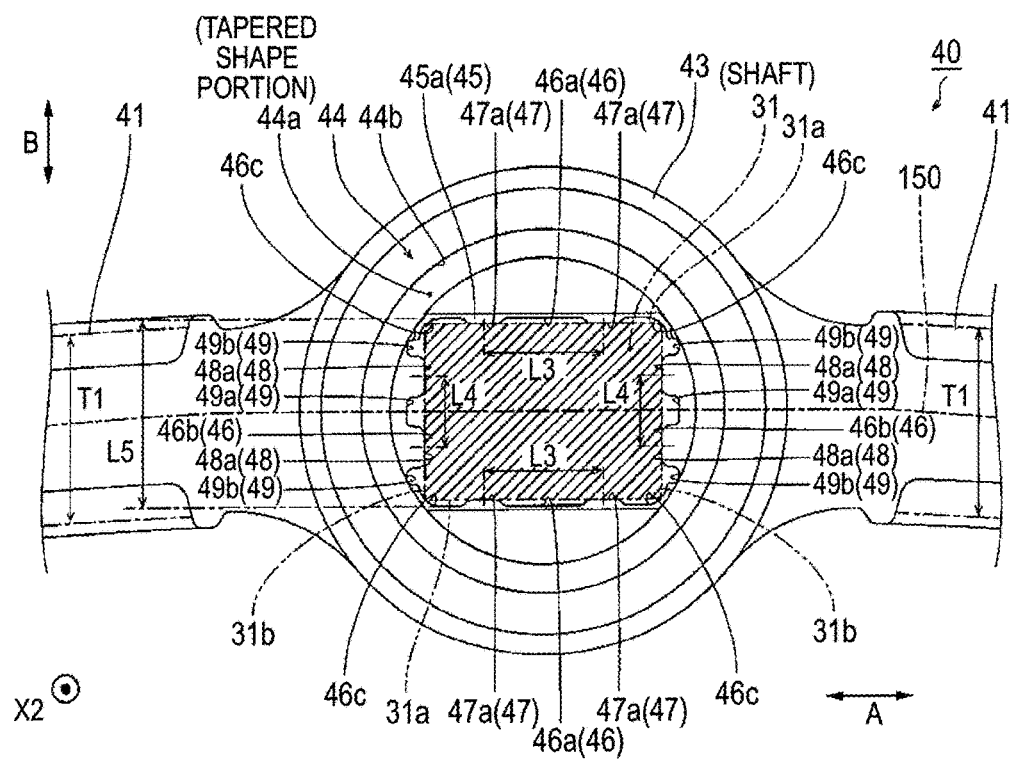
FIG. 7 is a view illustrating a structure of a valve body that constitutes the intake control valve according to the embodiment disclosed here, when viewed along a rotary axis direction.

The shaft 31 is made of a metal (e.g., a stainless steel or an aluminum alloy) and has a rectangular shape in cross section. In this case, as illustrated in FIG. 7, the shaft 31 is surrounded by a pair of outer side faces 3a constituting the long sides of the rectangular shape in cross section and a pair of outer side faces 31b constituting the short sides of the rectangular shape in cross section. In addition, the shaft 31 linearly extends in an X-axis direction (an example of the rotary axis direction) in which the intake ports 2a to 2d are arranged side by side, and penetrates the four second port portions 22 (see FIG. 1). The actuator 33 is a direct acting negative pressure actuator, and serves as a driving source that rotates in unison the four valve bodies 40 into which the shaft 31 is inserted (press-fitted) by transmitting the driving force to the shaft 31 via the link member 34.

Further, the shaft 31 is fixed in a state where the shaft 31 sequentially penetrates rotary shaft main bodies 42 (to be described below) of the four valve bodies 40 aligned side by side in the X-axis direction. In addition, the four valve bodies 40 in which the shaft 31 is disposed are rotatably supported at the opposite ends by the bearing parts 61 and 62, respectively, which are disposed in concave holding portions 81 and 82 (two locations) formed in the end partition walls 12, respectively. At the same time, the portions of the valve bodies 40 corresponding to the intermediate portions of the shaft 31 are rotatably supported by the three bearing parts 51 and 52, which are arranged in the concave holding portions 70 (three locations) formed in the intermediate partition walls 11, respectively. Further, an annular bearing 65 is fitted into each of the bearing part 62 and the centrally positioned bearing part 52. As a result, the rotary shaft portions 43 at one ends of the two valve bodies 40 among the four valve bodies 40 are rotatably supported by the bearing part 62 and the bearing part 52 via the bearings 65. The rotary shaft portions 43 at the opposite ends of the remaining two valve bodies 40 are slidably (rotatably) supported directly on the bearing part 61 and the bearing part 51 without interposing the bearings 65.

(Detailed Structure of Valve Body)

Figure 4:
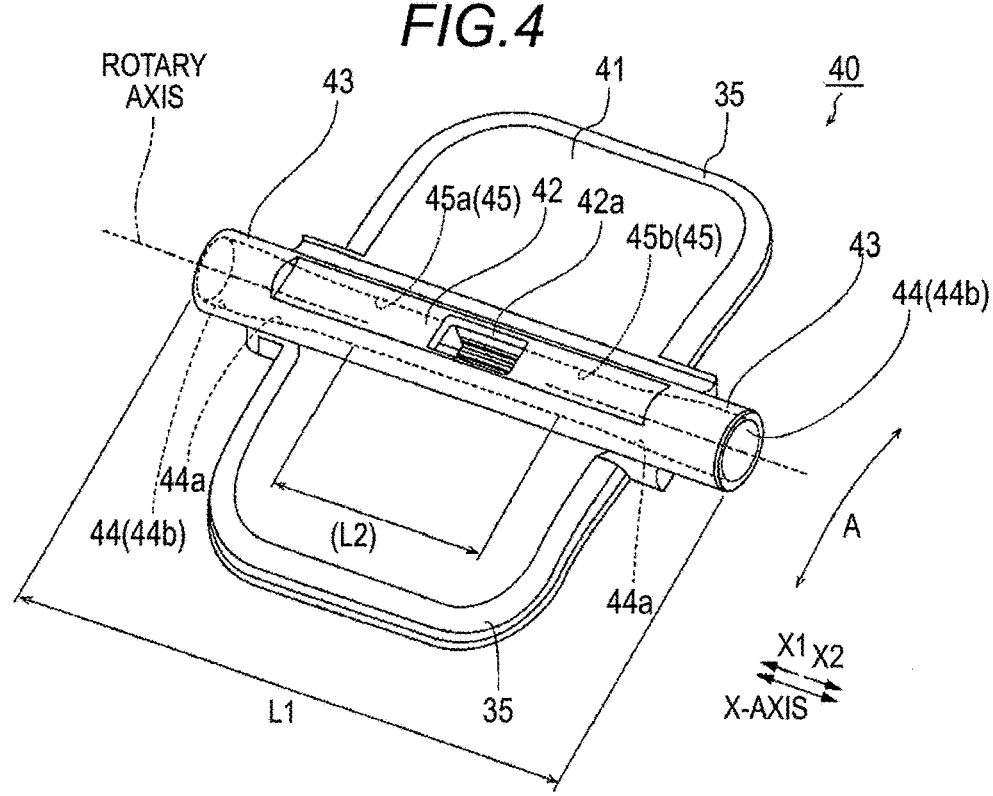
FIG. 4 is a perspective view illustrating a structure of a valve body that constitutes the intake control valve according to an embodiment disclosed here.
Figure 5:
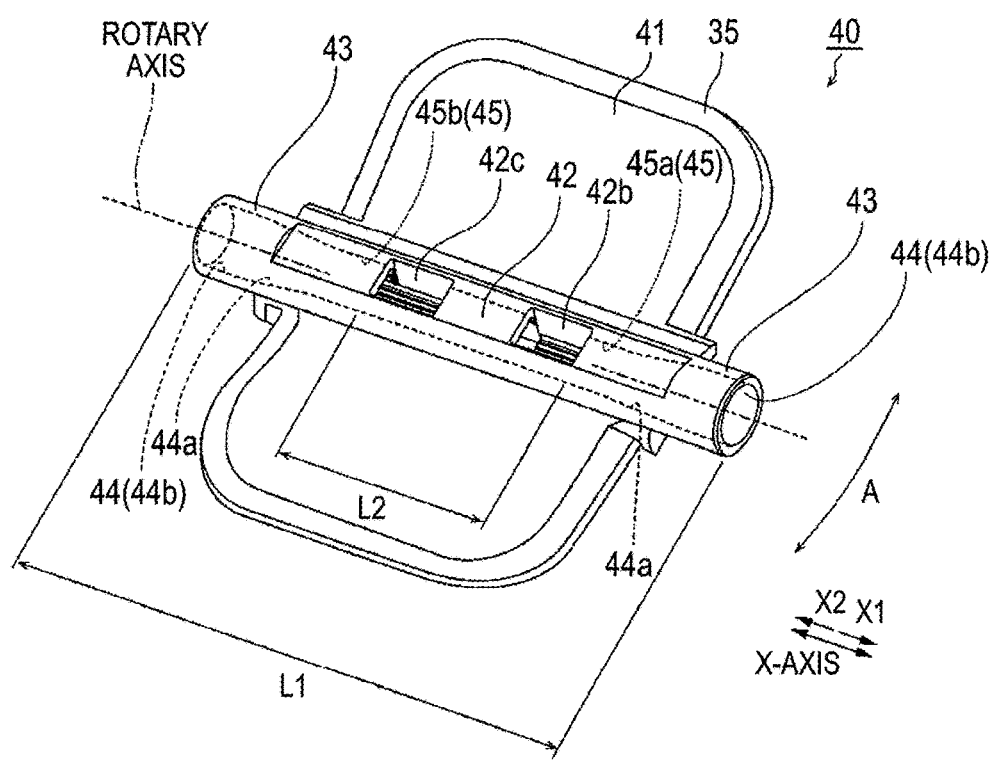
FIG. 5 is a perspective view illustrating a structure of a valve body that constitutes the intake control valve according to the embodiment disclosed here.

As illustrated in FIGS. 4 and 5, each valve body 40 includes a wing unit 41 that is made of a resin (for example, 6, 6-nylon) and slightly warped (see FIG. 2) and a rotary shaft main body 42 that extends in the X-axis direction in the center portion in the longitudinal direction (the direction of arrow A) in which the wing unit 41 extends. That is, as illustrated in FIG. 2, the valve body 40 has a shape that is bilaterally symmetrical (in the direction of arrow A) when viewed from the X-axis direction. As illustrated in FIGS. 4 and 5, the wing unit 41 is provided with a rounded R shape at four corners to correspond to the shape of the inner surface of an opening portion 24 (see FIG. 1).

A pair of rotary shaft portions 43 protruding in the directions of arrows X1 and X2 from the wing unit 41 and having a cylindrical shape are formed at the opposite end portions of the rotating shaft main body 42 in the valve body 40 in the X-axis direction. Each of the rotary shaft portions 43 is slidably (rotatably) supported by any one of the bearing parts 51, 52, 61 and 62 (see FIG. 3) arranged at the lateral sides of the valve body 40. As a result, the four valve bodies 40 are slidably (rotatably) supported by the bearing parts 51, 52, 61 and 62. FIG. 4 illustrates the structure of the valve body 40 when viewed from the rear side (the outside of the curved portion of the wing unit 41), and FIG. 5 illustrates the structure of the valve body 40 when viewed from the inner side (the inside of the curved portion of the wing unit 41). Further, the distance between a pair of rotary shaft portions 43 is L1.

In addition, as illustrated in FIG. 4, the valve body 40 has a single window portion 42a, which is formed to open toward the front side on the figure in the center portion in the X-axis direction of the rotary shaft main body 42. As illustrated in FIG. 5, the valve body 40 has a pair of window portions 42b (X1 side) and 42c (X2 side), each of which is formed between the central portion and one of the opposite end portions of the rotary shaft main body 42. The window portions 42a to 42c correspond to extraction holes of a mold 202 (see FIG. 9) when molding a rotary shaft press-fit hole 45 (described later) in the valve body 40 due to the manufacturing process. The window portions 42a to 42c are also used in order to insert jigs (not illustrated) thereinto to allow the shaft 31 to linearly penetrate the valve body 40 without distortion along the X-axis direction even when the shaft 31 is press-fitted into the valve body 40 after resin molding. Each of the window portions 42a to 42c has a width (in the direction indicated by arrow A) of a pair of outer surfaces 31a constituting the long sides of the rectangular shape in cross section of the shaft 31 and as a result, has an opening shape extending by a predetermined distance along the X-axis direction.

Figure 6:
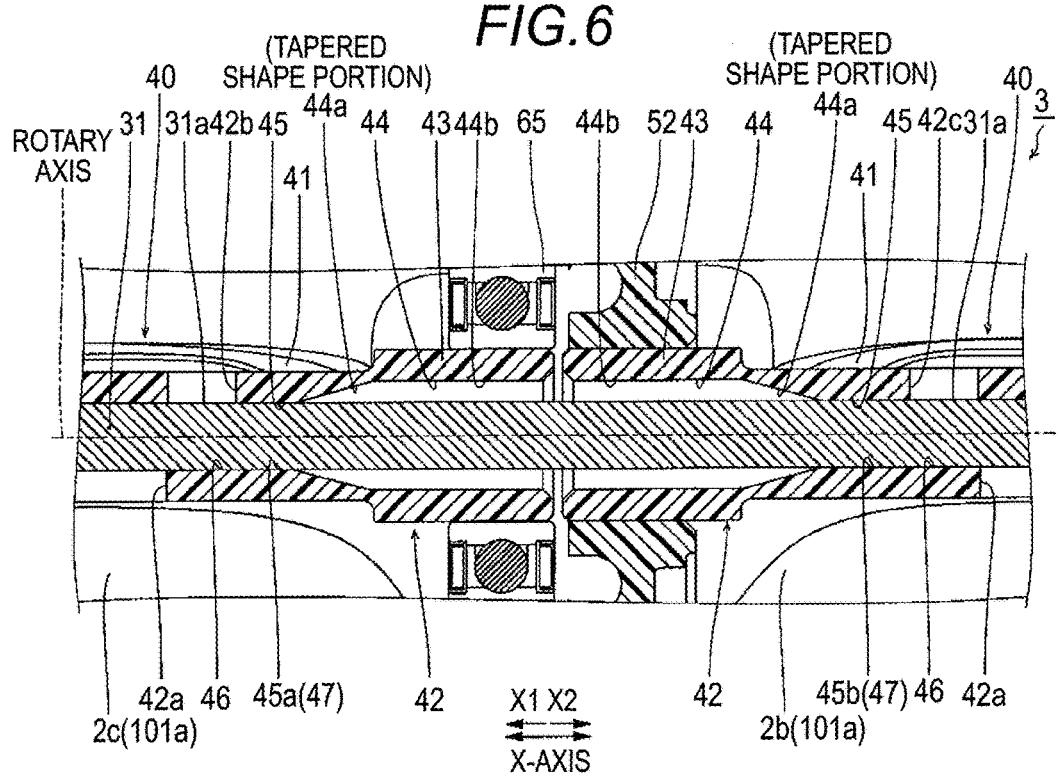
FIG. 6 is a view illustrating a part of the structure illustrated in FIG. 3 in an enlarged scale.

In this embodiment, as illustrated in FIGS. 3 and 6, the rotary shaft main body 42 of each valve body 40 includes a rotary shaft press-fit guide hole 44 that is provided at an end in the X-axis direction (rotary axis direction) to guide the inserting operation of the shaft 31 at the time of press-fitting the shaft 31, and a rotary shaft press-fit hole 45 that is provided at the more inner side in the X-axis direction (the center side of the rotary shaft main body 42) than the rotary shaft press-fit guide hole 44 so that the shaft 31 inserted through the rotary shaft press-fit guide hole 44 is press-fitted into the rotary shaft press-fit hole 45. In addition, in the state where the shaft 31 is fixed (press-fitted) to the rotary shaft main body 42, the outer surface 31a of the shaft 31 is exposed from the window portions 42a to 42c. Further, as illustrated in FIG. 6, the rotary shaft press-fit guide hole 44 has a tapered shape portion 44a which gradually decreases in cross-sectional area toward the rotary shaft press-fit hole 45 when viewed from the X-axis direction.

In addition, the rotary shaft portions 43 of the valve body 40 are provided at the opposite ends of the valve body 40 in the X-axis direction, and the rotary shaft press-fit hole 45 includes a first rotary shaft press-fit hole 45a provided between the rotary shaft press-fit guide hole 44 and the window portion 42b, which correspond to the rotary shaft portion 43 on one side (X1 side), and a second rotary shaft press-fit hole 45b provided between the rotary shaft press-fit guide hole 44 and the window portion 42c, which correspond to the rotary shaft portion 43 on the other side (X2 side). In addition, the first rotary shaft press-fit hole 45a and the second rotary shaft press-fit hole 45b have the same structure.

Further, the first rotary shaft press-fit hole 45a is provided at a more inner side (X2 side) in the X-axis direction than the rotary shaft part 43 on the X1 side, and the second rotary shaft press-fit hole 45b is provided at a more inner side (X1 side) in the X-axis direction than the moving shaft portion 43 on the X2 side. In this case, as illustrated in FIG. 5, the first rotary shaft press-fit hole 45a and the second rotary shaft press-fit hole 45b are separated from each other with a distance L2 between press-fitted positions. Further, as illustrated in FIG. 7, the first rotary shaft press-fit hole 45a and the second rotary shaft press-fit hole 45b correspond to the shaft 31 (within the hatched region) having a rectangular shape in cross section when viewed from the X-axis direction. In addition, the inner peripheral surfaces 44b of the rotary shaft press-fit guide holes 44, each of which has a circular shape when viewed from the X-axis direction (see FIGS. 6 and 7), are smoothly connected, via the tapered shape portions 44a, to the inner surface 46 of the first rotary shaft press-fit hole 45a and the inner surface 46 of the second rotary shaft press-fit hole 45b, respectively, each of which has a rectangular shape in cross section.

Further, each of the first rotary shaft press-fit hole 45a and the second rotary shaft press-fit hole 45b is provided with plural projections (first projections 47 and second projections 48 to be described later) which are provided on the inner surfaces thereof. The valve body 40 is fixed to the shaft 31 as the plural projections (the first projections 47 and the second projections 48) of the rotary shaft press-fit hole 45 abut against the outer surfaces 31a and 31b of the shaft 31.

Further, as illustrated in FIG. 7, the inner surfaces 46 of the first rotary shaft press-fit hole 45a (the second rotary shaft press-fit hole 45b) include a pair of first inner surfaces 46a that are opposite to each other in the direction of arrow B when viewed from the X-axis direction and constitute the long sides of the rectangular shape and a pair of second inner surfaces 46b that are opposite to each other in the direction of arrow A when viewed from the X-axis direction and constitute the short sides of the rectangular short side. Similarly, the second rotary shaft press-fit hole 45b also has a pair of first inner surfaces 46a and a pair of second inner surfaces 46b. In addition, the plural projections include two first projections 47 provided on each of the first inner surfaces 46a and two projections 48 provided on each of the second inner surfaces 46b.

A formation interval L3 between adjacent first projections 47 provided on the first inner surfaces 46a is larger than a formation interval L4 between adjacent second projections 48 provided on the second inner surfaces 46b (L3>L4). In addition, in the first rotary shaft press-fit hole 45a (the second rotary shaft press-fit hole 45b), the first inner surfaces 46a extend along the longitudinal direction (direction of arrow A) of the valve body 40 where the wing unit 41 extends, when viewed from the X-axis direction. A center line of the first rotary shaft press-fit hole 45a (the second rotary shaft press-fit hole 45 b) along the first inner surfaces 46a coincides with a center line 150 (a dash-dotted line) of the wing unit 41 along the longitudinal direction of the valve body 40, and the opposite distance L5 between the pair of first inner surfaces 46a is substantially equal to the thickness T1 (general thickness) of the wing unit 41 (L1=T1).

In addition, each first projection 47 has a flat abutment surface 47a extending along the outer surface 31a of the shaft 31. In addition, each second projections 48 has flat abutment surfaces 48a extending along the outer surface 31b of the shaft 31. In addition, each of the first projection 47 and the second projection 48 has a trapezoidal shape to slightly protrude to the shaft 31 side.

Therefore, the portions of the outer surfaces 31a of the shaft 31, which extend in the direction of arrow A, and the abutment surfaces 47a (four abutment surfaces in total) of the first projections 47 in the first rotary shaft press-fit hole 45a abut against each other, and the portions of the outer surfaces 31b of the shaft 31, which extend in the B direction, and the abutment surfaces 48a (four abutment surfaces in total) of the second projections 48 in the first rotary shaft press-fit hole 45a abut against each other. Similarly, the portions of the outer surfaces 31a of the shaft 31, which extend in the direction of arrow A, and the abutment surfaces 47a (four abutment surfaces in total) of the first projections 47 in the second rotary shaft press-fit hole 45b abut against each other, and the portions of the outer surfaces 31b of the shaft 31, which extend in the direction of arrow B, and the abutment surfaces 48a (four abutment surfaces in total) of the second projections 48 in the second rotary shaft press-fit hole 45b abut against each other. In addition, as illustrated in FIGS. 3 and 6, each of the valve bodies 40 is fixed to the outer surfaces 31a and 31b of the single shaft 31 by two positions of the first rotary shaft press-fit hole 45a and the second rotary shaft press-fit hole 45b.

In this embodiment, as illustrated in FIG. 7, the first projections 47 of the first inner surfaces 46a and the second projections 48 of the second inner surfaces 46b, which are adjacent to each other, are connected to each other by the portions of the inner surfaces 46 (four corner portions 46c), each of which has a rounded R shape of the rotary shaft press-fit hole 45. In addition, each of the first projections 47 and the second projections 48 extends along the X-axis direction in which the rotary shaft press-fit hole 45 extends. In this case, the two first projections 47 extend in parallel to each other along the X-axis direction, and the two second projections 48 extend parallel to each other along the X-axis direction.

Figure 8:
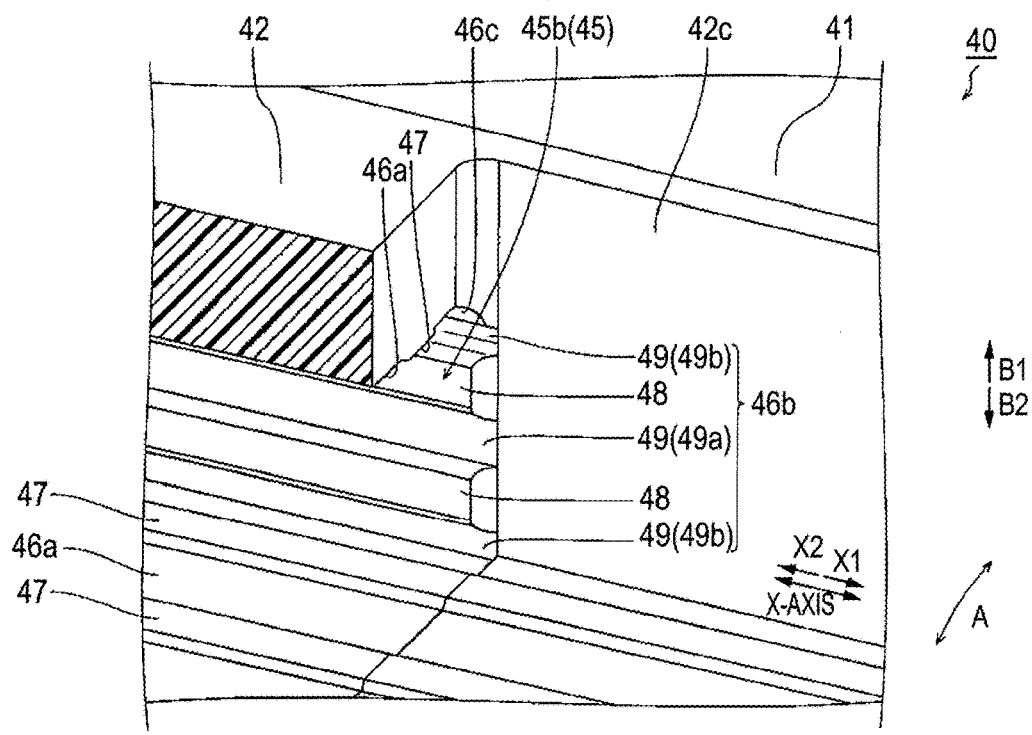
FIG. 8 is a view illustrating a structure of a rotary shaft press-fit hole inside a window portion of the valve body illustrated in FIG. 5, in an enlarged scale.

Each of the first rotary shaft press-fit hole 45a and the second rotary shaft press-fit hole 45b has grooves 49 provided on the second inner surfaces 46b and extending along the second projections 48. Specifically, as illustrated in FIGS. 7 and 8, in the second inner surfaces 46b, one groove 49a is formed between two adjacent second projections 48, and a pair of grooves 49b are formed on the side opposite to the grooves 49a of the second projections 48. In the first inner surfaces 46a, no groove 49 is formed. The reason why the grooves 49a and 49b are provided will be described below. The grooves 49a and 49b are necessary due to the manufacturing process of the valve body 40.

Figure 9:
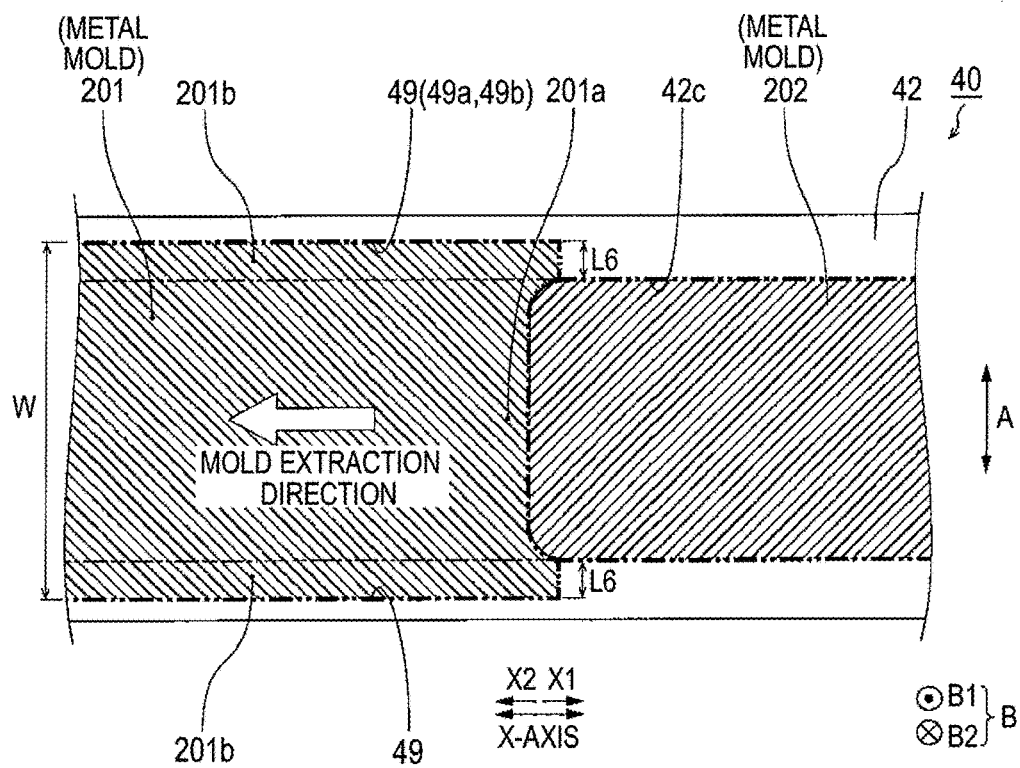
FIG. 9 is a view for describing a manufacturing process of the valve body that constitutes the intake control valve according to the embodiment disclosed here.

More specifically, as illustrated in FIG. 9, when the valve body 40 is resin-molded, two types of molds 201 and 202 are used in order to form the rotary shaft press-fit hole 45 in the turning shaft main body 42. That is, in a state where the mold 201 is arranged on the X2 side in the figure and the mold 202 is disposed on the X1 side in the figure, the mold 201 and the mold 202 are set in a state of being in contact with each other. Further, in order to form an external shape from the outside of the rotary shaft body portion 42 to the wing unit 41, another mold (not illustrated) is set on the outside of the mold 201. In this state, a resin is injection molded. Thereafter, the mold 201 is extracted in the direction of arrow X2 and the mold 202 is extracted in the direction of arrow X1, so that the portions of the rotary shaft press-fit hole 45 in the valve body 40 (see FIG. 5) are formed.

Here, it is necessary to form an abutment portion 201a against the mold 202, on the tip end portion of the X1 side of the mold 201. Further, in the abutment portion 201a, a pair of ribs 201b (three ribs when viewed from the X-axis direction) are provided to protrude by a protrusion length L6 in the direction of arrow A. Then, by bringing the mold 201 and the mold 202 into contact with each other, the inner surface of the rotary shaft press-fit hole 45 including the window portion 42c (42b, 42a) is formed, and the injection molding of a resin is performed.

By providing the pair of ribs 201b on the mold 201, unlike the case where the ribs 201b are not provided, the width W (the thickness of the mold) in the direction of arrow A of the mold 201 may increase as the ribs 201b are provided. Therefore, even when the mold matching for making the mold 201 abut against the mold 202 is repeated, the wear and damage of the abutment portion 201a in the mold 201 is hardly caused as the width W (the thickness of the mold) of the abutment portion 201a is thickened. In other words, it is possible to manufacture a larger number of valve bodies 40 using one mold 201. Therefore, by removing the mold 201 having the ribs 201b, the portions which have been the ribs 201b become the grooves 49a and 49b on the second inner surfaces 46b.

Further, as illustrated in FIG. 7, when the shaft 31 is press-fitted into the first rotary shaft press-fit hole 45a (the second rotary shaft press-fit hole 45b), the outer surfaces 31a constituting the long sides of the rectangular shape abut against the first projections 47 so as to face the first inner surfaces 46a. Further, the outer surfaces 31a are also exposed from the window portions 42a to 42c. At this time, jigs (not illustrated) for allowing the shaft 31 to be linearly penetrated without distortion along the X-axis direction are inserted in the window portions 42a to 42c (see FIGS. 4 and 5) in advance. In addition, when the insertion operation of the shaft 31 is guided by the jigs via the window portions 42a to 42c while the shaft 31 is being inserted, the outer surfaces 31a constituting the long sides of the rectangular shape reliably receive the correcting force from the jigs. Accordingly, as the pressure receiving area from the outer surfaces 31a of the shaft 31 to the jigs is secured via the window portions 42a to 42c having a sufficient opening area, the stress generated according to the press-fitting of the shaft 31 into the first rotary shaft press-fit hole 45a of the shaft 31 and the second rotary shaft press-fit hole 45b is reduced so that the damage of the valve body 40 is avoided.

In addition, as illustrated in FIG. 1, a rubber-made seal member 35 is provided on the peripheral edge of the valve body 40 such that a sealing property in relation to the seal surface 24a of the opening 24 in the closed state (see FIG. 2) of the valve body 40 is improved. In addition, the intake control valve 3 rotates the shaft 31 to rotate four valve bodies 40 in the same phase, thereby synchronizing the opening/closing operations of the opening portions 24 that correspond to all the four intake ports 2a to 2d, respectively. The intake device 100 according to this embodiment is configured as described above.

(Effect of Embodiment)

In this embodiment, the following effects can be obtained.

As described above, this embodiment provides a resin-made valve body 40 that includes the rotary shaft press-fit guide hole 44 provided at the end portion in the X-axis direction (rotary axis direction) to guide the shaft 31 when the shaft 31 is press-fitted, and the rotary shaft press-fit hole 45 provided at the more inner side than the rotary shaft press-fit guide hole 44 in the rotary axis direction so that the shaft 31 inserted via the rotary shaft press-fit guide hole 44 is press-fitted into the rotary shaft press-fit hole 45. As a result, even if the resin-made valve body 40 has a warpage along the X-axis direction in a single body state, the interval of the press-fitted positions (distance L2 between the press-fitted positions) may be made shorter since the valve body 40 is fixed (retained) to the shaft 31 in a portion of the rotary shaft press-fit hole 45 (the first rotary shaft press-fit hole 45a and the second rotary shaft press-fit hole 45b) positioned at a more inner side in the X-axis direction (closer to the center) than the press-fit guide hole 44 in the end portion, unlike a case in which the shaft 31 is easily bent and deformed along the warped shape of the valve body 40, for example, when the shaft 31 is press-fitted into the valve body 40 to the holding positions of the opposite end portions (a pair of the rotary shaft portions 43) of the valve body 40 (a distance between press-fitted positions: distance L1).

Therefore, as the shaft 31 made of a metal is constrained by the portions of the first rotary shaft press-fit hole 45a and the second rotary shaft press-fit hole 45b, which are spaced apart from each other with a shorter distance L2 between the press-fitted positions, it is possible to correct the warpage of the resin-made valve body 40 using the rigidity of the shaft 31 in a short distance. That is, due to the improvement of the degree of concentricity of the opposite end portions of the valve body 40 (reduction of an axial displacement amount), it is possible to reduce the rotating resistance of the rotary shaft portions 43 of the valve bodies 40 with respect to the bearing parts 51, 52, 61, and 62 that rotatably support the valve bodies 40.

Further, since the shaft 31 is not in the state of being press-fitted in the rotary shaft press-fit guide hole 44, the outer diameter of the rotary shaft portions 43 of the valve body 40 is not enlarged (expanded), which may also reduce the rotating resistance of the rotary shaft portions 43 of the valve body 40. Further, since the rotating resistance of the rotary shaft portions 43 of the valve body 40 is reduced, the occurrence of uneven wear on the bearing parts 51, 52, 61 and 62 of the rotary shaft portions 43 is suppressed. Therefore, an excessive gap does not occur between the rotary shaft portion 43 and the bearing parts 51, 52, 61, 62, and the occurrence of leakage of intake air between the adjacent intake ports 2a to 2d can be suppressed. As a result, it is possible to suppress an increase in the rotating resistance of the rotary shaft portions 43 on the valve body 40 side with respect to the bearing parts 51, 52, 61, and 62 on the intake ports 2a to 2d side, and it is also possible to improve the sealing property of the valve body 40 such that the intake air pulsation can be effectively obtained to improve the performance of the engine 110. Further, since the rotating resistance of the rotary shaft portions 43 of the valve body 40 is reduced, it is possible to obtain the intake device 100 in which the actuator 33 for rotating the shaft 31 is downsized.

In this embodiment, the rotary shaft press-fit guide hole 44 provided at the end portion in the rotary axis direction includes the tapered shape portion 44a which gradually decreases in cross-sectional area toward the rotary shaft press-fit hole 45 when viewed from the X-axis direction. Thus, when assembling the shaft 31 to the valve body 40, the shaft 31 may be guided to the rotary shaft press-fit hole 45 using the gently tapered shape portion 44a of the rotary shaft press-fit guide hole 44 as a guide while the shaft is being inserted. Therefore, since the tip end portion of the shaft 31 is prevented from directly scraping the resin-made inner surfaces of the rotary shaft press-fit hole 45 during the insertion of the shaft 31, the inner dimension of the rotary shaft press-fit hole 45 during the molding is maintained as it is so that a fastening force (holding force) after the press-fitting of the shaft 31 can be easily obtained. As a result, rattling of the valve body 40 with respect to the shaft 31 (physical interference of the valve body 40 to the inner surfaces of the intake ports 2a to 2d during the operation thereof) can be suppressed, and thus the malfunction of the valve body 40 can be suppressed. Further, by providing the tapered shape portion 44a in the rotary shaft press-fit guide hole 44, it is not necessary to perform a machining for preventing resin shaving (chamfering or taper machining) on the shaft 31 side, and as a result, it is possible to simplify the manufacturing process of the shaft to that extent.

Further, in this embodiment, the rotary shaft press-fit hole 45 is provided in the more inner side (X2 side and X1 side) in the X-axis direction than the rotary shaft portions 43 and is configured to have a rectangular shape in cross section, which corresponds to the shaft 31 having a rectangular shape in cross section, as when viewed from the X-axis direction. Further, the inner peripheral surface 44b of the rotary shaft press-fit guide hole 44 having a circular shape when viewed from the X-axis direction is configured to be smoothly connected to the inner surfaces 46 of the rotary shaft press-fit hole 45 having a rectangular shape in cross section via the tapered shape portion 44a. Accordingly, the valve body 40 can be manufactured in such a manner that the rotary shaft portions 43, within which the rotary shaft press-fit guide hole 44 having a circular shape is formed, have a uniform thickness around the rotary axis (X-axis). Thus, even when the valve body 40 is resin-molded, it is possible to uniformize and minimize the shrinkage of the resin member around the rotary axis after the resin molding so that the circularity of the rotary shaft portions 43 can be maintained. Further, by smoothly connecting the inner peripheral surface 44b of the rotary shaft press-fit guide hole 44 to the inner surfaces 46 of the rotary shaft press-fit hole 45 having a rectangular shape in cross section via the tapered shape portion 44a, it is possible to effectively prevent the tip end portion of the shaft 31, which is guided by the gently tapered rotary shaft press-fit guide hole 44, from directly scraping the resin-made inner surfaces 46 of the rotary shaft press-fit hole 45 having a rectangular shape in cross section when the shaft 31 is press-fitted into the rotary shaft press-fit hole 45 via the rotary shaft press-fit guide hole 44.

Further, in this embodiment, the rotary shaft portions 43 are provided at the opposite end portions (X1 side and X2 side) of the valve body 40 in the X-axis direction, and the rotary shaft press-fit hole 45 is configured by the first rotary shaft press-fit hole 45a provided between the rotary shaft press-fit guide hole 44 and the window portion 42b corresponding to the rotary shaft portion 43 on one side and the second rotary shaft press-fit hole 45b provided between the rotary shaft press-fit guide hole 44 and the window portion 42c corresponding to the rotary shaft portion 43 on the other side. Accordingly, as compared with the case where the rotary shaft press-fit holes 45 are provided at the opposite end portions of the valve body 40 along the X-axis direction (the distance between press-fitted positions: distance L1), it is possible to shorten the distance from the first rotary shaft press-fit hole 45a to the second rotary shaft press-fit hole 45b in the X-axis direction (distance L2 between press-fitted positions). That is, even if the resin-made valve body 40 has a warpage along the X-axis direction in a single body state, the rigidity of the shaft 31, which is fixed (supported) at two places of the first rotary shaft press-fit hole 45a and the second rotary shaft press-fit hole 45b, can be maintained since the distance from the first rotary shaft press-fit hole 45a to the second rotary shaft press-fit hole 45b (distance L2 between the press-fitted positions) is short. Therefore, after the shaft 31 is press-fitted, the warpage of the valve body 40 can be reliably corrected by effectively using the rigidity of the shaft 31 itself.

Further, in this embodiment, plural projections (the first projections 47 and the second projections 48) provided on the inner surfaces 46 of the rotary shaft press-fit hole 45 abut against the outer surfaces 31a and 31b of the shaft 31 so as to fix the valve body 40 to the shaft 31. As a result, unlike the case where a press-fitting load is applied from the outer surfaces 31a and 31b of the shaft 31 to the entire region of the inner surfaces 46 of the rotary shaft press-fit hole 45, the acting points of the press-fitting load from the outer surfaces 31a and 31b of the shaft 31 can be limited only to the portions of the first projections 47 and the second projections 48 on the inner surfaces 46 of the rotary shaft press-fit hole 45. That is, since the press-fitting load of the shaft 31 to the rotary shaft press-fit hole 45 (valve body 40) can be reduced, it is possible to avoid the occurrence of cracking in the rotary shaft press-fit hole 45 after the press-fitting. As a result, it is possible to appropriately maintain the fixing force of the valve body 40 by the press-fitting while suppressing a decrease in the productivity of the valve body 40 due to the damage of the resin-made valve body 40.

Further, in this embodiment, the inner surfaces 46 of the rotary shaft press-fit hole 45 include a pair of first inner surfaces 46a opposed to each other when viewed from the X-axis direction and constituting the long sides of a rectangular shape, and a pair of second inner surfaces 46b opposed to each other and constituting the short sides of the rectangular shape. Two first projections 47 are provided on the first inner surfaces 46a and two second projections 48 are provided on the second inner surfaces 46b. The formation interval L3 between adjacent first projections 47 is set to be larger than the formation interval L4 between adjacent second projections 48. Accordingly, it is possible to control (adjust) the acting points of the press-fitting load from the outer surfaces 31a of the shaft 31 to the first inner surfaces 46a and the acting points of the press-fitting load from the outer surfaces 31b of the shaft 31 to the second inner surfaces 46b to correspond to the first inner surfaces 46a and the second inner surfaces 46b, which have different sizes, respectively. As a result, it is possible to easily avoid occurrence of cracking in the inner surface 46 (the first inner surface 46a and the second inner surface 46b) of the rotary shaft press-fit hole 45 after press-fitting of the shaft 31.

Further, in this embodiment, the first projections 47 of the first inner surfaces 46a and the second projections 48 of the second inner surfaces 46b, which are adjacent to each other, are connected to each other by rounded portions of the inner surfaces 46 of the rotary shaft press-fit hole 45 (four corner portions 46c). As a result, the stress in the first inner surfaces 46a and the second inner surfaces 46b at the time of press-fitting the shaft 31 into the rotary shaft press-fit hole 45 can be uniformly distributed by the rounded portions of the inner surfaces 46 (the four corner portions of the inner surfaces 46) of the rotary shaft press-fit hole 45 between the first projections 47 of the first inner surface 46a and the second projections 48 of the second inner surface 46b, which are adjacent to each other. Accordingly, it is possible to avoid the damage of the valve body 40 due to a stress concentration when the shaft 31 is press-fitted into the rotary shaft press-fit hole 45.

Further, in this embodiment, grooves 49 provided on the second inner surfaces 46b and extending along the second projections 48 are provided in the rotary shaft press-fit hole 45. Accordingly, due to the manufacturing process of the valve body 40, when the mold 201 for resin-molding the rotary shaft press-fit hole 45 (45a, 45b) including the second inner surfaces 46b having the second projections 48 and the grooves 49 and extending in the X-axis direction and the mold 202 for resin-molding the window portions 42a to 42c which expose the outer surfaces 31a of the shaft 31 press-fitted into the rotary shaft press-fit hole 45 are combined with each other, it is possible to secure a "projection margin" (ribs 201b to be a relief margin of the mold 201) by an amount corresponding to the formation of the grooves 49 on the abutment portion 201a of the mold 201 against the mold 202. That is, it is possible to increase the size of the mold 201 (the thickness of the mold) by an amount corresponding to the provision of the projection margin (ribs 201b) for forming the groove 49 in the mold 201. As a result, since the life of the mold 201 to be repeatedly used can be prolonged, the number of valve bodies 40 manufactured using one set of molds 201 and 202 can be increased.

In this embodiment, the first inner surfaces 46a are configured to extend along the longitudinal direction (the direction of the arrow A) of the valve body 40 where the wing units 41 extend when viewed from the X-axis direction. As a result, as the direction in which the pair of first inner surfaces 46a extend is aligned with the direction in which the wing units 41 extend, the direction between the pair of second inner surfaces 46b constituting the short sides of the rectangular shape extend may be aligned with the thickness direction of the wing units 41 of the valve body 40. This enables the thickness T1 (general thickness) of the wing units 41 of the valve body 40 to be reduced, so that the pressure loss of the intake air flowing around the valve body 40 in the intake ports 2a to 2d can be reduced.

Further, in this embodiment, since the center line 150 of the rotary shaft press-fit hole 45 along the first inner surfaces 46a coincides with the center line 150 of the wing unit 41 along the longitudinal direction of the valve body 40, the opposite distance L5 between the pair of first inner surfaces 46a and the thickness T1 of the wing unit 41 are formed to be approximately equal to each other. As a result, even when the pair of second inner surfaces 46b of the rotary shaft press-fit hole 45 are pressed by the outer surfaces 31a of the shaft 31 along the longitudinal direction (the direction of arrow A) of the valve body 40, the deformation (warpage) of the wing unit 41 according to the press-fitting of the shaft 31 can be minimized by using the rigidity of the wing unit 41 side since the wing units 41 of a solid structure having the thickness T1, which is equal to the opposite distance between the pair of first inner surfaces 46a, exist behind the second inner surfaces 46b.

Further, in this embodiment, the plural projections (four first projections 47 and four second projections 48) are each formed to extend along the X-axis direction in which the rotary shaft press-fit hole 45 extends. As a result, since the shaft 31 can be supported by the plural projections (four first projections 47 and four second projections 48) over the formation region of the plural projections (four first projections 47 and four second projections 48) extending in the X-axis direction, it is possible to uniformly support (hold) the shaft 31 over the formation region of the rotary shaft press-fit hole 45.

Further, in this embodiment, each of the plural projections (the four first projections 47 and the four second projections 48) has a flat surface-shaped abutment surface 47a extending along the outer surface 31a of the shaft 31 or a flat surface-shaped abutment surface 48a extending along the outer surface 31b. Thus, the rotary shaft press-fit hole 45 of the valve body 40 can be reliably brought into a surface contact with the outer surfaces 31a and 31b of the shaft 31 via the abutment surfaces 47a extending in the flat surface shape of the first projections 47 and the abutment surfaces 48a extending in the flat surface shape of the second projections 48. Further, due to such a surface contact-based fixing, the valve body 40 can be stably fixed to the outer surfaces 31a and 31b of the shaft 31.

[Modification]

The embodiment disclosed here is to be considered in all respects as illustrative, but not restrictive. The scope of this disclosure is represented not by the description of the embodiment but by the appended claims, and includes all the changes (modifications) within the meaning and scope equivalent to the appended claims.

For example, in the above-described embodiment, two first projections 47 are provided on each of the first inner surfaces 46a and two second projections 48 are provided on each of the second inner surfaces 46b, but this disclosure is not limited thereto. For example, one first projection 47 may be provided on each of the first inner surfaces 46a and one second projection 48 may be provided on each of the second inner surfaces 46b. That is, in the first rotary shaft press-fit hole 45a (the second rotary shaft press-fit hole 45b), the number of press-fitted places of the shaft 31 may be four.

In the above-described embodiment, the first projections 47 of the first inner surfaces 46a and the second projections 48 of the second inner surfaces 46b, which are adjacent to each other, are connected by the R shape portions of the inner surfaces 46 (four corner portions 46c), but this disclosure is not limited thereto. Each corner portion 46c may be constituted by a linear inclined surface (chamfered portion of 45 degrees). This also makes it possible to avoid the damage of the valve bodies 40 due to the stress concentration caused when the shaft 31 is press-fitted into the rotary shaft press-fit hole 45.

In addition, in the above-described embodiment, each of the first projections 47 and the second projections 48 is formed in a trapezoidal shape having the abutment surface 47a or the abutment surface 48a, but this disclosure is not limited thereto. For example, each of the first projections 47 and the second projections 48 may be configured to have a striated (elongated) and rounded abutment surface having a width smaller than the trapezoidal shape, or in a rectangular shape rather than the trapezoidal shape.

The above embodiment represents an example in which the valve body 40 is applied to the intake control valve 3 that changes the intake passage length, but this disclosure is not limited thereto. The valve body 40 may be applied to an intake valve other than the intake control valve that changes the intake path length, such as a tumble control valve (TCV) that generates a tumble and a swirl control valve (SCV) that generates a swirl.

In the above embodiment, a bearing 65 is interposed between the rotary shaft portions 43 at one ends of the two valve bodies 40 among four valve bodies 40 so as to rotatably support the rotary shaft portions, but this disclosure is not limited thereto. That is, without using the bearing 65, the intake control valve 3 may be configured such that the rotary shaft portions 43 of the valve body 40 are directly slid with respect to the bearing parts to be rotatably supported.

The above embodiment illustrates an example in which the common actuator 33 for the four valve bodies 40 is connected to one end of the shaft 31, but this disclosure is not limited thereto. An actuator common to the plural valve bodies 40 may be disposed between the plural valve bodies 40 and connected to the central part of the shaft 31.

Further, in the above embodiment, a direct acting negative pressure actuator is used as the actuator 33, but this disclosure is not limited thereto. For example, an electric actuator may be used.

The above embodiment illustrates an example in which the intake device 100 is applied to the in-line four-cylinder engine 110 for an automobile, but this disclosure is not limited thereto. The intake device of this disclosure may be applied to an internal combustion engine other than the automobile engine 110 or to an engine (internal combustion engine) 110 other than the in-line four-cylinder engine.

In the above embodiment, this disclosure is applied to the intake device 100 installed in a vehicle (automobile) provided with the engine 110 comprising a gasoline engine, but this disclosure is not limited thereto. That is, this disclosure can be applied to the intake device 100 mounted on a diesel engine and a gas engine other than a gasoline engine.

An intake device according to an aspect of this disclosure includes: a rotary shaft; and a resin-made intake valve including a rotary shaft press-fit guide hole provided at an end portion in a rotary axis direction to guide the rotary shaft when the rotary shaft is press-fitted, a rotary shaft press-fit hole provided on a more inner side than the rotary shaft press-fit guide hole in the rotary axis direction, the rotary shaft inserted through the rotary shaft press-fit guide hole being press-fitted into the rotary shaft press-fit hole, and a window portion configured to expose an outer surface of the rotary shaft press-fitted to the rotary shaft press-fit hole. The resin intake valve is rotated together with the rotation of the rotary shaft in an intake port to change intake air. The rotary shaft press-fit guide hole has a tapered shape portion which gradually decreases in cross-sectional area toward the rotary shaft press-fit hole when viewed from the rotary axis direction.

As described above, the intake device according to one aspect of this disclosure includes a resin-made intake valve including a rotary shaft press-fit guide hole provided at an end portion in a rotary axis direction to guide the rotary shaft when the rotary shaft is press-fitted, a rotary shaft press-fit hole provided at a more inner side than the rotary shaft press-fit guide hole in the rotary axis direction. The rotary shaft inserted through the rotary shaft press-fit guide hole is press-fitted into the rotary shaft press-fit hole. Accordingly, even if the resin-made intake valve has a warpage along the rotary axis direction in a single body state, the interval of the press-fitted positions (distance between the press-fitted positions) in the case where plural press-fitted positions are provided may be made shorter since the intake valve is fixed (retained) to the rotary shaft in a portion of the rotary shaft press-fit hole positioned at a more inner side in the rotary axis direction (closer to the center) than the rotary shaft press-fit guide hole in the end portion, unlike a case in which the rotary shaft is easily bent and deformed along the warped shape of the intake valve, for example, when the rotary shaft is press-fitted into the intake valve at the opposite end portions of the intake valve. Therefore, as the rotary shaft is constrained by the portions of plural rotary shaft press-fit holes with a shorter distance between the press-fitted positions, it is possible to correct the warpage of the intake valve using the rigidity of the rotary shaft in the short distance. That is, due to the improvement of the degree of concentricity of the opposite end portions of the intake valve (reduction of an axial displacement amount), it is possible to reduce the rotating resistance of the rotary shaft portions of the intake valve with respect to the bearing parts which rotatably support the intake valve.

Further, since the rotary shaft is not in the state of being press-fitted in the rotary shaft press-fit guide hole, the outer diameter of the rotary shaft portions of the intake valve is not enlarged (expanded), which may also reduce the rotating resistance of the rotary shaft portions of the intake valve. Further, since the rotating resistance of the rotary shaft portions of the intake valve is reduced, the occurrence of uneven wear on the bearing parts of the rotary shaft portions is suppressed. Therefore, an excessive gap does not occur between the rotary shaft portions and the bearing parts, and the occurrence of leakage of intake air between the adjacent intake ports can be suppressed. As a result, it is possible to suppress an increase in the rotating resistance of the rotary shaft portions on the intake valve side with respect to the bearing parts on the intake ports side, and it is also possible to improve the sealing property of the intake valve such that the intake air pulsation can be effectively obtained to improve the engine performance. Further, since the rotating resistance of the rotary shaft portions of the intake valve is reduced, it is possible to obtain the intake device in which the actuator for rotating the rotary shaft is downsized.

In addition, in the intake device according to an aspect of this disclosure, the rotary shaft press-fit guide hole provided at the end portion in the rotary axis direction includes the tapered shape portion which gradually decreases in cross-sectional area toward the rotary shaft press-fit hole when viewed from the rotary axis direction. Thus, when assembling the rotary shaft to the intake valve, the rotary shaft may be guided to the rotary shaft press-fit hole using the gently tapered shape portion of the rotary shaft press-fit guide hole as a guide while the rotary shaft is being inserted. Therefore, since the tip end portion of the shaft is prevented from directly scraping the resin-made inner surface of the rotary shaft press-fit hole during the insertion of the rotary shaft, the inner size of the rotary shaft press-fit hole during the molding is maintained as it is so that a fastening force (holding force) after the press-fitting of the rotary shaft can be easily obtained. As a result, rattling of the intake valve with respect to the rotary shaft (physical interference of the intake valve to the inner surfaces of the intake ports during the operation thereof) can be suppressed, and thus the malfunction of the intake valve can be suppressed. Further, by providing the tapered shape portion in the rotary shaft press-fit guide hole, it is not necessary to perform a machining for preventing resin shaving (chamfering or taper machining) on the rotary shaft side, and as a result, it is possible to simplify the manufacturing process of the rotary shaft to that extent.

It is preferable that the intake device according to the aspect of this disclosure further includes a bearing part disposed on an intake port side to rotatably support the intake valve, the intake valve further includes a rotary shaft portion rotatably inserted into the bearing part and having the rotary shaft press-fit guide hole formed therein, the rotary shaft press-fit hole is provided at a more inner side than the rotary shaft portion in the rotary axis direction and may have a rectangular shape in cross section corresponding to the rotary shaft having a rectangular shape in cross section when viewed from the rotary axis direction, and the inner peripheral surface of the rotary shaft press-fit guide hole, which has a circular shape when viewed from the rotary axis direction, is smoothly connected to an inner surface of the rotary shaft press-fit hole having a rectangular shape in cross section via a tapered shape portion.

With this configuration, the intake valve can be manufactured in such a manner that the rotary shaft portions, within which the rotary shaft press-fit guide hole having a circular shape is formed, have a uniform thickness around the rotary axis. Thus, even when the intake valve is resin-molded, it is possible to uniformize and minimize the shrinkage of the resin member around the rotary axis after the resin molding so that the circularity of the rotary shaft portions can be maintained. Further, by smoothly connecting the inner peripheral surface of the rotary shaft press-fit guide hole to the inner surface of the rotary shaft press-fit hole having a rectangular shape in cross section via the tapered shape portion, it is possible to effectively prevent the tip end portion of the rotary shaft, which is guided by the gently tapered rotary shaft press-fit guide hole, from directly scraping the resin-made inner surface of the rotary shaft press-fit hole having a rectangular shape in cross section when the rotary shaft is press-fitted into the rotary shaft press-fit hole via the rotary shaft press-fit guide hole.

In this case, it is preferable that the rotary shaft portion is provided at each of opposite end portions of the intake valve in the rotary axis direction, and the rotary shaft press-fit hole includes a first rotary shaft press-fit hole provided between the window portion and the rotary shaft press-fit guide hole corresponding to the rotary shaft portion of one side and a second rotary shaft press-fit hole provided between the rotary shaft press-fit guide hole corresponding to the rotary shaft portion of the other side and the window portion.

With this configuration, as compared with the case where the rotary shaft press-fit holes are provided at the opposite end portions of the intake valve along the rotary axis direction, it is possible to shorten the distance from the first rotary shaft press-fit hole to the second rotary shaft press-fit hole in the rotary axis direction (interval between press-fitted positions). That is, even if the resin-made intake valve has a warpage along the rotary axis direction in a single body state, the rigidity of the rotary shaft, which is fixed (supported) at two places of the first rotary shaft press-fit hole and the second rotary shaft press-fit hole, can be maintained since the distance from the first rotary shaft press-fit hole to the second rotary shaft press-fit hole (interval between the press-fitted positions) is short. Therefore, after the rotary shaft is press-fitted, the warpage of the intake valve can be reliably corrected by effectively using the rigidity of the rotary shaft itself.

In the intake device according to the aspect of this disclosure, it is preferable that the rotary shaft press-fit hole has plural projections provided on the inner surface of the rotary shaft press-fit hole, and the intake valve is fixed to the rotary shaft as the plural projections of the rotary shaft press-fit hole abut against the outer surface of the rotary shaft.

With this configuration, unlike the case where a press-fitting load is applied from the outer surfaces of the rotary shaft to the entire region of the inner surfaces of the rotary shaft press-fit hole, the acting points of the press-fitting load from the outer surfaces of the rotary shaft can be limited only to the portions of the plural projections on the inner surfaces of the rotary shaft press-fit hole. That is, since the press-fitting load of the rotary shaft to the rotary shaft press-fit hole (intake valve) can be reduced, it is possible to avoid the occurrence of cracking in the rotary shaft press-fit hole after the press-fitting. As a result, it is possible to appropriately maintain the fixing force of the intake valve by the press-fitting while suppressing a decrease in the productivity of the intake valve due to the damage of the resin-made intake valve.

In the configuration in which the rotary shaft press-fit hole has plural projections provided on the inner surfaces of the rotary shaft press-fit hole, it is preferable that, when viewed from the rotary axis direction, the inner surface of the rotary shaft press-fit hole has a pair of first inner surfaces facing each other and constituting long sides of a rectangular shape and a pair of second inner surfaces facing each other and constituting short sides of the rectangular shape, the plural projections include plural first projections provided on the first inner surfaces, and plural second projections provided on the second inner surfaces, and an interval between adjacent first projections provided on the first inner surface is larger than an interval between adjacent second projections provided on the second inner surface.

With this configuration, it is possible to control (adjust) the acting points of the press-fitting load from the outer surfaces of the rotary shaft to the first inner surfaces and the acting points of the press-fitting load from the outer surfaces of the rotary shaft to the second inner surfaces to correspond to the first inner surfaces and the second inner surfaces, which have different sizes, respectively. As a result, it is possible to easily avoid the occurrence of cracking in the inner surfaces (the first inner surface and the second inner surface) of the rotary shaft press-fit hole after press-fitting of the rotary shaft.

In the configuration in which the interval between the first projections is larger than the interval between the second projections, it is preferable that the first projections of the first inner surfaces and the second projections of the second inner surfaces, which are adjacent to each other, are connected by a rounded portion of the inner surfaces in the rotary shaft press-fit hole.

With this configuration, the stress in the first inner surfaces and the second inner surfaces at the time of press-fitting the rotary shaft into the rotary shaft press-fit hole can be uniformly distributed by the rounded portions of the inner surfaces (the four corner portions of the inner surfaces) of the rotary shaft press-fit hole between the first projections of the first inner surface and the second projections of the second inner surface, which are adjacent to each other. Accordingly, it is possible to avoid the damage of the intake valve due to a stress concentration when the rotary shaft is press-fitted into the rotary shaft press-fit hole.

In the configuration in which the interval between the first projections is larger than the interval between the second projections, it is preferable that the rotary shaft press-fit hole further includes a groove provided on the second inner surface and extending along the second projections.

With this configuration, in the manufacturing process of the intake valve, when a first mold for resin-molding the rotary shaft press-fit hole including the second inner surfaces including the second projections and the grooves and extending in the rotary axis direction and a second mold for resin-molding the window portions which expose the outer surfaces of the rotary shaft press-fitted into the rotary shaft press-fit hole are combined with each other, it is possible to secure a "projection margin" (a relief margin of the mold) by an amount corresponding to the formation of the grooves on the abutment portion of the first mold against the second mold. That is, it is possible to increase the size of the first mold (the thickness of the mold) by an amount corresponding to the provision of the projection margin for forming the grooves in the first mold. As a result, the life of the first mold to be repeatedly used can be prolonged, so that the number of intake valves manufactured using one set of molds (a combination of the first mold and second mold) can be increased.

In the intake device according to the aspect of this disclosure, it is preferable that the intake valve further includes a rotary shaft portion having a rotary shaft press-fit hole formed therein and a wing unit extending from the rotary shaft portion in a longitudinal direction of the intake valve, which is orthogonal to the rotary shaft, and the first inner surface extends along the longitudinal direction of the intake valve extending from the wing unit when viewed from the rotary axis direction.

With this configuration, as the direction in which the pair of first inner surfaces extend is aligned with the direction in which the wing units extend, the direction in which the pair of second inner surfaces constituting the short sides of the rectangular shape extend may be aligned with the thickness direction of the wing units. This enables the thickness of the wing units of the intake valves to be reduced, so that the pressure loss of the intake air flowing around the intake valves in the intake ports can be reduced.

In the intake device according to the aspect of this disclosure, it is preferable that a center line of the rotary shaft press-fit hole along the first inner surfaces coincides with a center line of the wing unit along the longitudinal direction of the intake valve, and an opposite interval of the pair of first inner surfaces and a thickness of the wing unit are equal to each other.

With this configuration, even when the pair of second inner surfaces of the rotary shaft press-fit hole are pressed by the outer surfaces of the rotary shaft along the longitudinal direction of the intake valve, the deformation (warpage) of the wing unit according to the press-fitting of the rotary shaft can be minimized by using the rigidity of the wing unit side since the wing unit of a solid structure having the thickness, which is equal to the opposite distance between the pair of first inner surfaces, exists behind the second inner surfaces.

In the intake device according to the aspect described above, it is preferable that each of the plural projections extends in a direction where the rotary shaft press-fit hole extends.

With this configuration, since the rotary shaft can be supported by the plural projections over the formation region of the plural projections extending in the rotary axis direction, it is possible to uniformly support (hold) the rotary shaft over the formation region of the rotary shaft press-fit hole.

In the intake device according to the aspect described above, it is preferable that each of the projections has an abutment surface having a flat surface shape extending along the outer surface of the rotary shaft.

With this configuration, the rotary shaft press-fit hole of the intake valve can be reliably brought into a surface contact with the outer surfaces of the rotary shaft via the abutment surfaces extending in the flat surface shapes of the first projections and the abutment surfaces extending in the flat surface shapes of the second projections. Further, due to such a surface contact-based fixing, the intake valve can be stably fixed to the outer surfaces of the rotary shaft.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An intake device comprising:
a rotary shaft;
a resin-made intake valve including a rotary shaft press-fit guide hole provided at an end portion in a rotary axis direction to guide the rotary shaft when the rotary shaft is press-fitted, a rotary shaft press-fit hole provided on a more inner side than the rotary shaft press-fit guide hole in the rotary axis direction, the rotary shaft inserted through the rotary shaft press-fit guide hole being press-fitted into the rotary shaft press-fit hole, and a plurality of windows configured to expose an outer surface of the rotary shaft press-fitted to the rotary shaft press-fit hole, the resin intake valve being rotated together with rotation of the rotary shaft in the intake port to change intake air; and a bearing part disposed on an intake port side to rotatably support the intake valve, wherein the rotary shaft press-fit guide hole has a tapered shape portion which gradually decreases in cross-sectional area toward the rotary shaft press-fit hole when viewed from the rotary axis direction, the intake valve further includes a shaft portion rotatably inserted into the bearing part, and having the rotary shaft press-fit guide hole formed therein, the rotary shaft press-fit hole is provided at a more inner side than the shaft portion in the rotary axis direction and has a rectangular shape in cross section corresponding to the rotary shaft having a rectangular shape in cross section when viewed from the rotary axis direction, an inner peripheral surface of the rotary shaft press-fit guide hole having a circular shape when viewed from the rotary axis direction is smoothly connected to an inner surface of the rotary shaft press-fit hole having the rectangular shape in cross section via the tapered shape portion, the shaft portion is provided at each of opposite end portions of the intake valve in the rotary axis direction, the rotary shaft press-fit hole includes a first rotary shaft press-fit hole provided between a first window of the plurality of windows and the rotary shaft press-fit guide hole corresponding to the shaft portion of one side and a second rotary shaft press-fit hole provided between the rotary shaft press-fit guide hole corresponding to the shaft portion of the other side and a second window of the plurality of windows, and the rotary shaft is press-fit into the first rotary shaft press-fit hole and second rotary shaft press-fit hole.

2. The intake device according to claim 1, wherein the rotary shaft press-fit hole has a plurality of projections provided on the inner surface of the rotary shaft press-fit hole, and the intake valve is fixed to the rotary shaft as the plurality of projections of the rotary shaft press-fit hole abut against the outer surface of the rotary shaft.

3. The intake device according to claim 2, wherein, when viewed from the rotary axis direction, the inner surface of the rotary shaft press-fit hole has a pair of first inner surface portions facing each other and constituting long sides of a rectangular shape and a pair of second inner surface portions facing each other and constituting short sides of the rectangular shape, the plurality of projections include a plurality of first projections provided on the first inner surface portions, and a plurality of second projections provided on the second inner surface portions, and an interval between adjacent first projections provided on the first inner surface is larger than an interval between adjacent second projections provided on the second inner surface.

4. The intake device according to claim 3, wherein, the first projections of the first inner surface portions and the second projections of the second inner surface portions, which are adjacent to each other, are connected by a rounded portion of the inner surface in the rotary shaft press-fit hole.

5. The intake device according to claim 3, wherein the rotary shaft press-fit hole further includes a groove provided on the second inner surface and extending along the second projections.

6. The intake device according to claim 3, wherein the intake valve further includes a wing unit extending from the shaft portion in a longitudinal direction of the intake valve, which is orthogonal to the rotary shaft, and the first inner surface portions extend along the longitudinal direction of the intake valve extending in the wing unit when viewed from the rotary axis direction.

7. The intake device according to claim 6, wherein a center line of the rotary shaft press-fit hole along the first inner surface portions coincides with a center line of the wing unit along the longitudinal direction of the intake valve, and a spacing between the pair of first inner surface portions and a thickness of the wing unit are equal to each other.

8. The intake device according to claim 2, wherein each of the plurality of projections extends in a direction where the rotary shaft press-fit hole extends.

9. The intake device according to claim 3, wherein each of the projections has an abutment surface having a flat surface shape extending along the outer surface of the rotary shaft.

* * * * *